United States Patent [19]
Stone

[11] 3,784,218
[45] Jan. 8, 1974

[54] VEHICLE TRAILER
[76] Inventor: Edwin A. Stone, 1433 Wescott Rd. No. 7, Colusa, Calif. 95932
[22] Filed: Apr. 12, 1971
[21] Appl. No.: 133,104

Related U.S. Application Data
[63] Continuation-in-part of Ser. No. 715,696, March 25, 1968, Pat. No. 3,574,388.

[52] U.S. Cl. .................................. 280/43.23
[51] Int. Cl. ........................................ B62d 21/18
[58] Field of Search .................... 280/43.23, 43.17

[56] References Cited
UNITED STATES PATENTS
3,427,041  2/1969  Nichols ........................... 280/43.23
2,934,228  4/1960  Hillberg .......................... 280/43.23
2,181,410  11/1939  Strandlund ..................... 280/43.17
2,452,267  10/1948  Schramm ........................ 280/43.23
2,519,002  8/1950  Stemen ........................... 280/43.23

Primary Examiner—Robert R. Song
Attorney—Gregg, Hendricson & Caplan

[57] ABSTRACT

A trailer vehicle having frame pivotally mounted on wheels with mechanical lock to lock frame in predetermined position in relation to wheels and with fluid pressure means to release mechanical lock and to cushion lowering and to effect raising of frame.

8 Claims, 4 Drawing Figures

INVENTOR:
EDWIN A. STONE

BY: Gregg, Henderson & Caplan
ATTORNEY

INVENTOR:
EDWIN A. STONE

VEHICLE TRAILER

This application is a continuation-in-part of my copending application, Ser. No. 715,696, entitled "Convertible Trailer," filed Mar. 25, 1968, now issued as U.S. Pat. No. 3,574,388.

This invention relates to a vehicle, primarily a trailer, but also a self-propelled vehicle, wherein the frame is adjustable in height relation to the wheels.

In my copending application there is described a trailer which is adapted to transport horses and small vehicles such as motor bikes, racing cars and the like, and also to serve as living quarters. This trailer vehicle has the advantages of an interior construction which is adjustable for different uses, e.g., for carrying a horse or racing car and for use as a living accommodation. This trailer also has means for raising and lowering it, e.g., raising it for road travel and lower it for convenience of loading and unloading.

One of the objects of the present invention is to provide a trailer or other support which is simple, rugged, and sturdy in construction, which provides comfortable riding qualities and which permits ready and dependable raising and lowering of the trailer.

The above and other objects of the invention will be apparent from the ensuing description and the appended claims.

One form of the invention is shown in the accompanying drawings in which.

Figure 1:
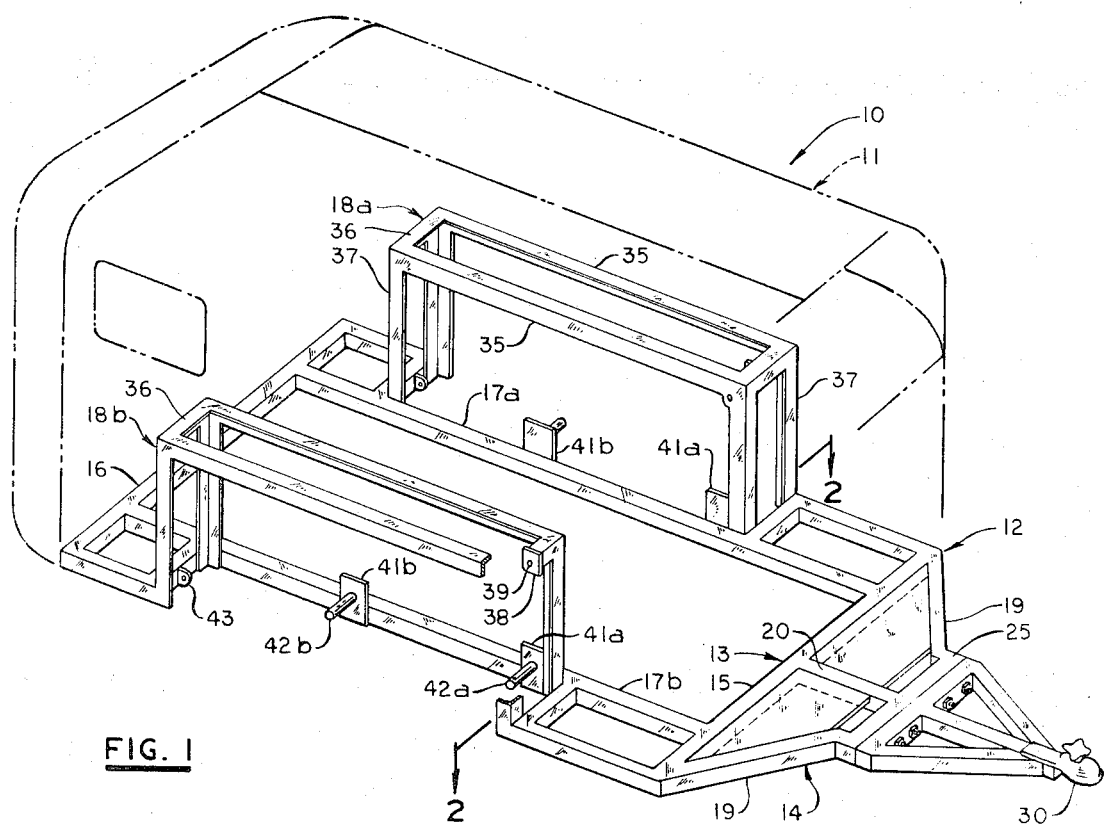
FIG. 1 is a perspective view of the framework or chassis also showing in broken lines a trailer housing mounted thereon.
Figure 2:
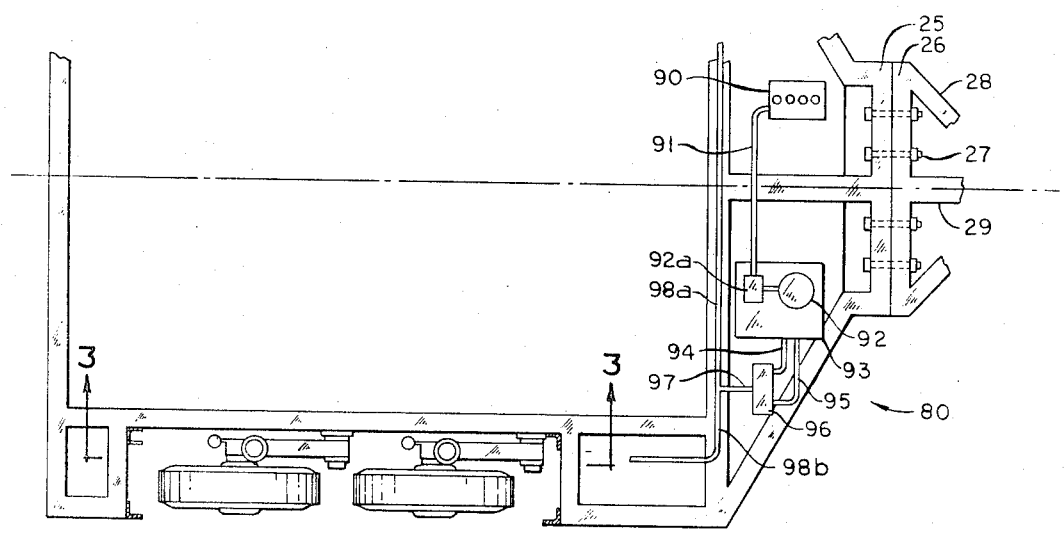
FIG. 2 is a horizontal sectional view taken along the line 2—2 of FIG. 1.

Referring now to the drawings and at first to FIGS. 1 and 2, the trailer is indicated generally by the reference numeral 10 and it comprises a trailer housing 11 mounted on a frame 12. The housing 11 may be that described in my copending application or it may be any other desired type of trailer housing.

The frame 12 comprises a main, rectangular frame 13 formed of a front cross bar 15, a rear cross bar 16 and side bars 17a and 17b. These frame members may be of channel, box, angle or any other desired steel construction and the several members and others described hereinafter may be joined by welding, bolting, riveting or by any other suitable means. A forward extension of the frame is shown at 14 to which the hitch is connected. Upstanding well members 18a and 18b are shown to receive the wheels and the mounting mechanism therefor as described below. The forward extension 14 consists of diagonal members 19 which extend forwardly and a tongue-like member 20 which also extends forwardly, all of which are suitably conencted as by means of welding to a cross bar 25, to which another cross bar 26 is bolted as by means of bolts 27. Diagonal members 28 and a tongue 29 are fixed to the cross member 26 and are fixed together at their outer ends, to which a standard hitch member 30 is connected for hitching the trailer to a towing vehicle. As stated above the vehicle 10 may, if desired, be a self-propelled vehicle in which case the hitch may be unnecessary.

Referring now more particularly to FIG. 1, the right-hand well member 18a (as viewed from the front of the trailer) will now be described, it being understood that the left-hand well member 18b is of identical construction. As will be seen, the well member 18a is of box-like construction, formed largely from angle stock suitably welded together and to the remainder of the frame. The components of the well member 18a comprise top longitudinal members 35 front and rear and top and bottom horizontal connecting members 36 and front and rear vertical connecting members 37. Also shown is a bracket 38 to which a pivot pin 39 is conencted and front and rear brackets 41a and 41b to which axles 42a and 42b are connected. Also shown is a bracket 43. Extensions 44 of the frame are also shown.

Figure 3:
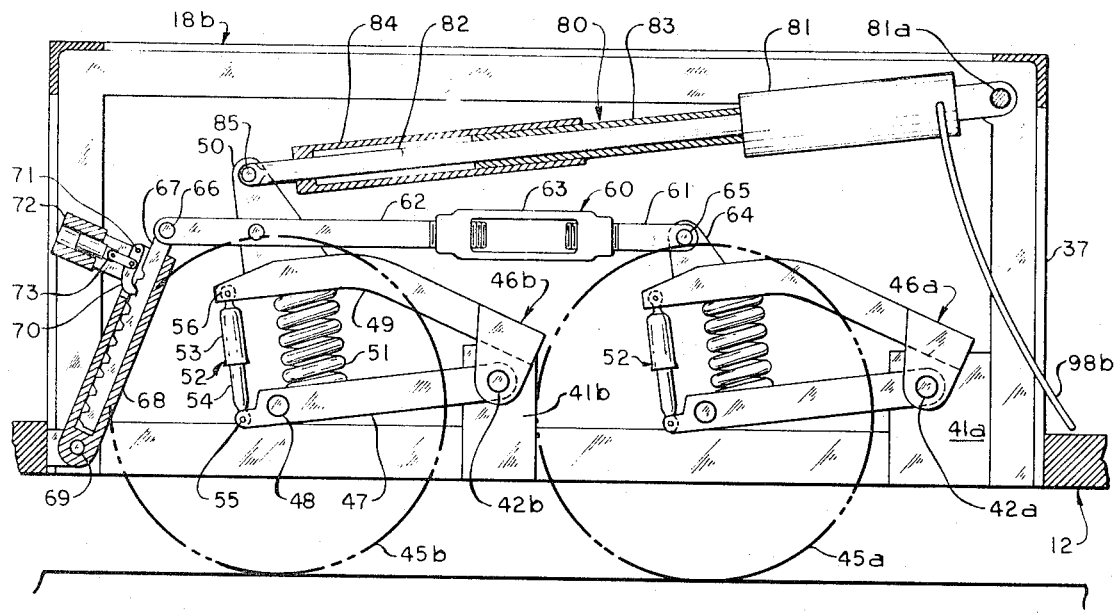
FIG. 3 is a view taken along the line 3—3 of FIG. 2 showing the mounting means for mounting the trailer on road or traction wheels. In this view the frame is shown in elevated position suitable for road travel.
Figure 4:
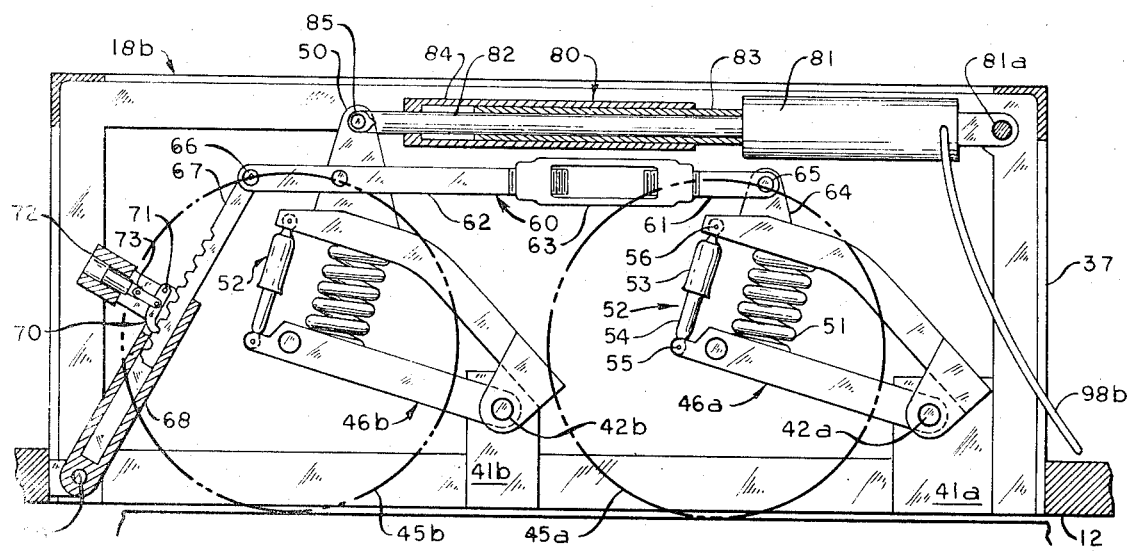
FIG. 4 is a similar view showing the trailer in lowered position as for loading and unloading.

Referring now to FIGS. 3 and 4 traction or road wheels 45a and 45b are shown, that shown at 45a being the front wheel and that shown at 45b being the rear wheel. It will be understood that identical wheels and identical mounting and operating means are provided on the other side of the vehicle.

The front wheel 45a is provided with mounting means 46a and the rear wheel 45b with substantially identical mounting means 46b. Only one of these mounting means will be described. Thus the mounting means 46b comprises an arm 47 rotatable at one end on the axle 42b and rotatably connected at its other end at 48 to the axle of the rear wheel 45b. The mounting means 46b also comprises an upper arm 49, one end of which is free to rotate on the axle 42b and near its other, free end the upper arm 49 is formed with an upstanding bracket 50 for a purpose hereinafter described. An expansion spring 51 is located between the two arms 47 and 49 and is held under compression. Also shown is a standard shock absorber 52 comprising an hydraulic cylinder 53 pivotally connected at 56 to the free end of the upper arm 49 and a rod 54 pivotally connected at 55 to one end of the lower arm 47. This type of suspension provides a free floating type of support for the trailer which absorbs shocks and gives an even ride.

There is also provided a mechanical lock for locking the trailer in its elevated position as shown in FIG. 3, such mechanical lock being generally designated by the reference numeral 60. It comprises two rods 61 and 62 connected by a turnbuckle 63 for adjustment for the purposes described hereinafter. The rod 61 is connected to a bracket 64 which is integral with the upper arm 49 of the suspension for the front wheel 45a. The end of the rod 62 remote from the turnbuckle 63 is pivotally connected at 66 to a rack or ratchet element 67 which is slidable in a sleeve 68 the lower end of which is pivotally connected at 69 to the frame. A pawl 70 is provided which is engageable with the rack or ratchet 67, such pawl being pivotally connected at 71 to the frame. The pawl 70 is operated by a solenoid 72 through its armature 73.

Also shown in an hydraulic operating mechanism generally designated by the reference numeral 80 which comprises an hydraulic cylinder 81 pivotally connected to the frame at 81a and having a rod 82. A first sleeve 83 is fixed to the cylinder 81 and is slidable in a second sleeve 84 which is fixed to the rod 82. These sleeves serve to stiffen and strengthen the rod 82. The outer end of the rod 82 is pivotally connected at 85 to the aforesaid bracket 50 which, in turn, is integral with the upper arm 49 of the rear wheel mounting 46b.

Referring now to FIG. 2, a control system is there shown comprising a battery 90, leads 91 from the battery to a switch 92a and an electric motor 92b which operates an hydraulic pump 93. An outlet conduit 94 and an inlet conduit 95 are provided for outflow and inflow of hydraulic fluid respectively from and to the motor 93. These conduits connect to the inlet port and the outlet port, respectively, of a valve 96 which has a conduit 97 which branches at 98a and 98b for the right side and left side of the vehicle, respectively. In operation, and referring now to FIG. 3, assuming that the trailer is in its elevated position and it is desired to lower it, a control switch (not shown) is closed to energize the electric motor 92 and thereby operate the hydraulic pump 93. The valve 96 will have been set to deliver fluid under pressure to lines 98a and 98b thereby operating the hydraulic cylinders 81 to drive their pistons (not shown) from right to left as viewed in FIGS. 3 and 4. This will move the piston rods 82 from right to left and this will have the effect of relieving the load on the pawl 70. The solenoids 72 will then be energized by a suitable control switch (not shown) to withdraw the pawls 70 form the ratchets 67. Therefore, the mechanical lock is released. The valve 96 (FIG. 2) is then reversed to allow bleeding of pressure from the cylinders 81. The weight of the trailer acts against the fluid in the cylinders 81 but in a gradual manner such that the trailer body is lowered at a controlled rate to the position shown in FIG. 4.

If it is desired to lower the trailer to an intermediate position somewhere between that of FIG. 3 and that of FIG. 4, the switch controlling the solenoid 72 is opened when the trailer has reached the desired level thereby causing the pawl 70 to engage again with the ratchet 67.

It will be apparent that by reversing this procedure the trailer can be raised from the position shown in FIG. 4 to that shown in FIG. 3 and if desired it can be stopped at any desired intermediate position.

If it is desired to adjust the center of balance of the trailer, the turnbuckles 63 are turned to shorten or lengthen the rods 61–62. For example, if the trailer is tilted forward and is imposing a load on the towing vehicle which it is desired to relieve, the rods 61–62 will be shortened which will have the effect of compressing springs 51 on the mounting means 46a, thereby tilting the trailer toward the rear, e.g., until the desired proportion of the load is carried by the trailer wheels. If the trailer is tilted too far to the rear, the rods 61–62 will be lengthened until, again, the desired load is carried by the wheels and the remainder by the towing vehicle.

It will therefore be apparent that a novel, useful and advantageous trailer construction is provided.

I claim:

1. A vehicle comprising:
   a. a frame having two sides, a front end and a rear end, a pair of wheels on each side of the frame, one of each such pair of wheels being located toward the front and the other toward the rear of the frame;
   b. means pivotaly mounting each wheel on the frame for swinging movement in a vertical plane;
   c. a mechanical locking mechanism on each side of the frame for locking the frame in predetermined vertical relation to said wheels and at a number of positions between an uppermost position and a lowermost position wherein the frame is at its highest position and at its lowest position relatively to the frame, respectively;
   d. each such locking mechanism being connected to the frame and to the pivotal mounting means of one of the pair of wheels on the respective side of the frame, each said mechanical locking mechanism having adjustment means for shifting the center of balance of the vehicle, such adjustment means comprising a rod connected at one end to the pivotal mounting on one of said wheels, a ratchet operable by the other end of said rod and a pawl pivoted on the frame and engageable with the ratchet to lock the ratchet in any of several selective positions, said rod being adjustable in length;
   e. said vehicle also comprising an hydraulic pressure operated mechanism on each side of the frame for releasing the mechanical locking mechanism, for cushioning descent of the frame from a higher position to a lower position and for elevating the frame from a lower position to a higher position, each said hydraulic mechanism being connected to the frame and to the pivotal mounting means of the other wheel on the respective side of the frame.

2. The vehicle of claim 10 including an electrical instrumentality operably connected to said pawl to cause the pawl to engage the ratchet when the instrumentality is in one of two states of energization — de-energization and to disengage the pawl from the ratchet when the instrumentality is in the other of said two conditions.

3. A vertically adjustable vehicle comprising a frame having a front end, a rear end and two sides; at least one axially aligned pair of wheels, one on each side of the frame; pivotal mounting means for each wheel whereby the frame can be adjusted in height in relation to the wheels between a lowermost position in close proximity to the ground and an uppermost position for road travel, said pivotal mounting means comprising, for each wheel, a pair of arms rotatably and independently mounted at adjacent ends on the frame for pivoting in a vertical plane, one of said arms being connected at its other end to its respective wheel whereby pivoting of such arm on the frame while the wheel is on the ground will raise and lower the frame; operating means on each side of the frame connected to the other of said arms for pivoting the same and a resilient connection between the members of each such pair of arms whereby force applied by said operating means through said other arms is transmitted to said first mentioned arms through said resilient means to pivot such arms and to raise and lower the frame.

4. The vehicle of claim 3 wherein said operating means is an hydraulic cylinder device, said vehicle also having a mechanical lock for locking the frame in any of several positions.

5. A vertically adjustable, four-wheeled vehicle comprising a frame having a front end, a rear end and two sides; two pairs of wheels comprising a front pair and a rear pair, the members of each pair of wheels being on opposite sides of the frame and in axial alignment, pivotal mounting means for each wheel comprising an arm for each wheel pivotally mounted at one end on the frame for pivoting in a vertical plane and connected at its other end to the respective wheel; operating means for operating said arms to pivot the same and to raise and lower the frame while the wheels are resting on the ground and means on at least one side of the vehicle interconnecting the two arms on the respective side of the vehicle for adjusting the center of balance of the frame and any load carried thereby.

6. A vertically adjustable four wheeled vehicle comprising a frame having a front end, a rear end and two sides; two pairs of wheels comprising a front pair and a rear pair the members of the pair of wheels being on opposite sides of the frame and in axial alignment; the mounting of such wheels being such that the frame can be lowered to a position below the axles of the wheels and in close proximity to the ground; said mounting comprising, for each wheel, a pair of arms comprising a first arm and a second arm having adjacent ends rotatably and independently mounted on the frame, the first of each pair of arms being connected at its other end to the respective wheel whereby pivoting of such first arm will tend to raise and lower the frame while the respective wheel is resting on the ground; operating means for pivoting said second arms, and resilient means interconnecting the first and second arms of each pair whereby pivoting of the second arms exerts a force through said resilient means on the first arms to effect raising and lowering of the frame.

7. The vehicle of claim 6 including an adjustable connection between the pairs of arms on each side of the frame whereby the center of balance of the vehicle can be adjusted.

8. The vehicle of claim 7 wherein said operating means comprises an hydraulic pressure device and the vehicle also has mechanical locking means for locking the frame in any of several positions.

* * * * *